US011615785B2

(12) United States Patent
Zhou et al.

(10) Patent No.: US 11,615,785 B2
(45) Date of Patent: Mar. 28, 2023

(54) SPEECH RECOGNITION USING NATURAL LANGUAGE UNDERSTANDING RELATED KNOWLEDGE VIA DEEP FEEDFORWARD NEURAL NETWORKS

(71) Applicant: Robert Bosch GmbH, Stuttgart (DE)

(72) Inventors: Zhengyu Zhou, Fremont, CA (US); Xuchen Song, Pittsburgh, PA (US)

(73) Assignee: ROBERT BOSCH GMBH

( * ) Notice: Subject to any disclaimer, the term of this patent is extended or adjusted under 35 U.S.C. 154(b) by 302 days.

(21) Appl. No.: 16/867,289

(22) Filed: May 5, 2020

(65) Prior Publication Data

US 2020/0357392 A1    Nov. 12, 2020

Related U.S. Application Data

(60) Provisional application No. 62/846,340, filed on May 10, 2019.

(51) Int. Cl.
*G10L 15/18* (2013.01)
*G10L 15/16* (2006.01)

(52) U.S. Cl.
CPC .......... *G10L 15/1822* (2013.01); *G10L 15/16* (2013.01)

(58) Field of Classification Search
CPC ..... G10L 15/1822; G10L 15/16; G10L 15/32; G10L 15/22; G10L 15/01; G10L 15/02; G10L 15/063; G10L 15/183; G10L 2015/225
See application file for complete search history.

(56) References Cited

U.S. PATENT DOCUMENTS

| | | | |
|---|---|---|---|
| 9,153,231 B1* | 10/2015 | Salvador | G10L 15/16 |
| 9,886,948 B1* | 2/2018 | Garimella | G10L 15/16 |
| 10,170,110 B2 | 1/2019 | Zhou et al. | |
| 10,453,117 B1* | 10/2019 | Reavely | G06N 5/027 |
| 11,069,352 B1* | 7/2021 | Tang | G10L 15/22 |
| 11,158,307 B1* | 10/2021 | Ghias | G06N 3/0445 |
| 2017/0270919 A1* | 9/2017 | Parthasarathi | G10L 15/02 |
| 2018/0096678 A1* | 4/2018 | Zhou | G10L 15/22 |
| 2019/0027133 A1* | 1/2019 | Georges | G10L 15/063 |

FOREIGN PATENT DOCUMENTS

CN    111291272 A    *    6/2020

OTHER PUBLICATIONS

M. Sundermeyer, et al. ("From Feedforward to Recurrent LSTM Neural Networks for Language Modeling," in IEEE/ACM Transactions on Audio, Speech, and Language Processing, vol. 23, No. 3, pp. 517-529, Mar. 2015, doi: 10.1109/TASLP.2015.2400218. https://ieeexplore.ieee.org/document/7050391 (Year: 2015).*

* cited by examiner

*Primary Examiner* — Pierre Louis Desir
*Assistant Examiner* — Keisha Y. Castillo-Torres
(74) *Attorney, Agent, or Firm* — Dickinson Wright PLLC

(57) ABSTRACT

A framework ranks multiple hypotheses generated by one or more ASR engines for each input speech utterance. The framework jointly implements ASR improvement and NLU. It makes use of NLU related knowledge to facilitate the ranking of competing hypotheses, and outputs the top-ranked hypothesis as the improved ASR result together with the NLU results of the speech utterance. The NLU results include intent detection results and the slot filling results.

16 Claims, 6 Drawing Sheets

SPEECH RECOGNITION USING NATURAL LANGUAGE UNDERSTANDING RELATED KNOWLEDGE VIA DEEP FEEDFORWARD NEURAL NETWORKS

CROSS-REFERENCE TO RELATED APPLICATIONS

This application claims the benefit of U.S. provisional application Ser. No. 62/846,340 filed May 10, 2019, the disclosure of which is hereby incorporated in its entirety by reference herein.

TECHNICAL FIELD

This disclosure relates generally to the field of automated speech recognition and, more specifically, to systems and methods that improve the operation of speech recognition systems that utilize one or multiple speech recognition engines.

BACKGROUND

Automated speech recognition is an important technique to implement human machine interfaces (HMIs) in a wide range of applications. In particular, speech recognition is useful in situations where a human user needs to focus on performing a task where using traditional input devices such as a mouse and keyboard would be inconvenient or impractical. For example, in-vehicle "infotainment" systems, home automation systems, and many uses of small electronic mobile devices such as smartphones, tablets, and wearable computers can employ speech recognition to receive speech based commands and other input from a user.

SUMMARY

A framework ranks multiple hypotheses generated by one or more ASR engines for each input speech utterance. The framework jointly implements ASR improvement and NLU. It makes use of NLU related knowledge to facilitate the ranking of competing hypotheses, and outputs the top-ranked hypothesis as the improved ASR result together with the NLU results of the speech utterance. The NLU results include intent detection results and the slot filling results.

The framework includes a deep feedforward neural network that may extract features from the hypotheses, the features are fed into an input layer with the same type of features from different hypotheses concatenated together to facilitate the learning. At least two projection layers are applied per feature type via a shared projection matrix to project the features from each hypothesis into a smaller space, and then a second regular project layer projects the smaller spaces from all hypotheses into a condensed representation. The projection layers may be bypassed if a feature type has number of features per hypothesis less than a threshold, Thereby feeding the corresponding features extracted from all hypotheses directly into the inner layers.

Joint modeling of ASR ranking and intent detection is used when the speech utterance is decoded by different types of ASR engines.

The framework extracts NLU relevant features. Trigger features are extracted based on the slot filling result of each hypothesis. BLSTM features represent the intent-sensitive sentence embedding, obtained by concatenating the last states of forward and backward LSTM RNN in the decoder of a NLU module during the processing of each hypothesis.

The framework predicts the ranking of the competing hypotheses and also generates the NLU results of the given speech utterance. The NLU result includes intent detection results and the slot filling results. Each input hypothesis is processed by the NLU module during feature extraction, obtaining NLU results. The framework then predicts the top-ranked hypothesis, and outputs the intention detection and slot filling results associated with that hypothesis as the NLU results of the input speech utterance.

DETAILED DESCRIPTION

Figure 1:
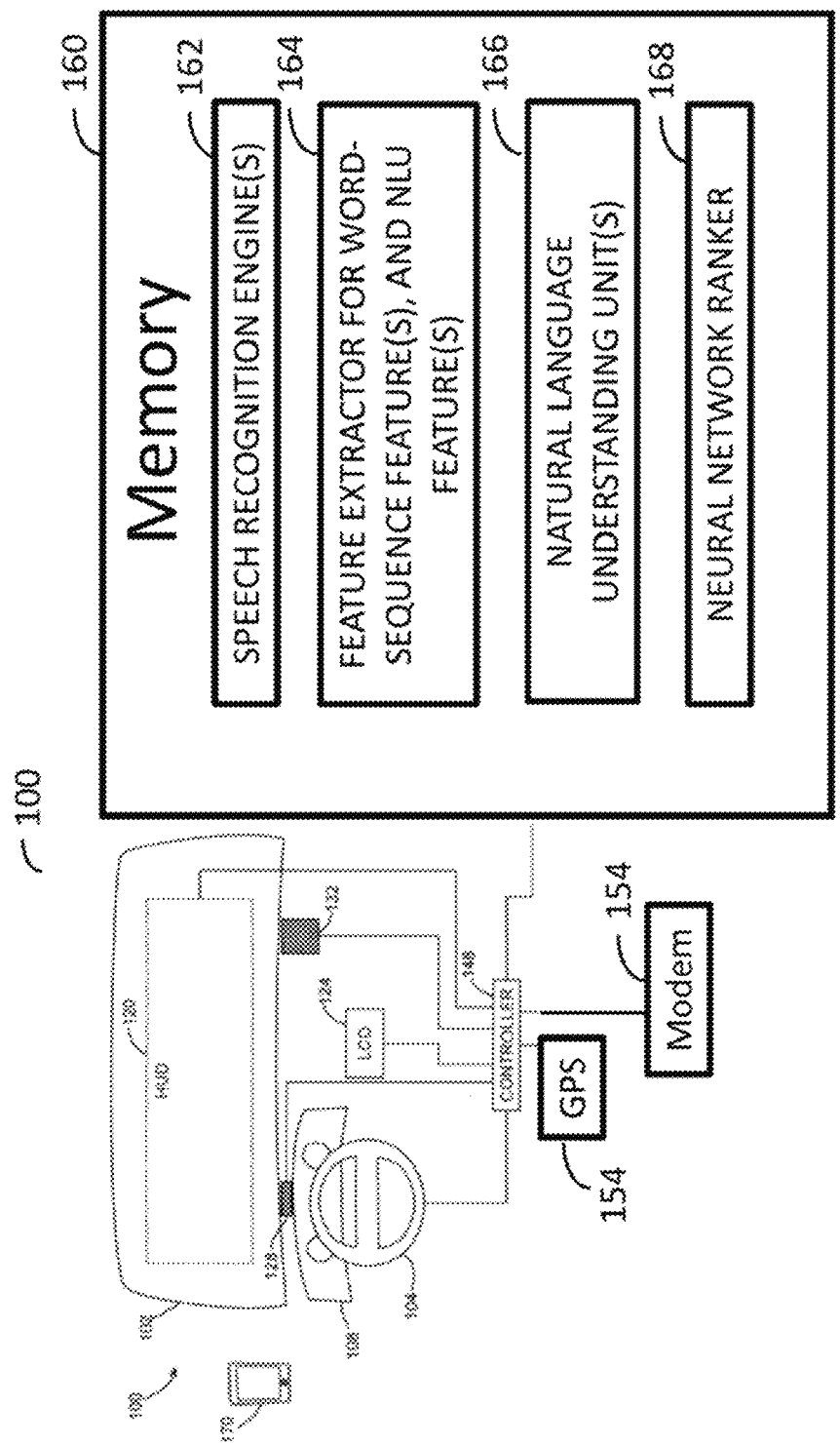
FIG. 1 is a block diagram of a speech based system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

A speech recognition systems may use a trained speech recognition engine to convert recorded spoken inputs from a user into digital data that is suitable for processing in a computerized system. A speech engine may perform natural language understanding techniques to recognize the words that the user speaks and to extract semantic meaning from the words to control the operation of a computerized system.

In some situations, a single speech recognition engine may not be optimal for recognizing speech from a user while the user performs different tasks. Some solutions attempt to combine multiple speech recognition systems to improve the accuracy of speech recognition including selecting low-level outputs from the acoustic models different speech recognition models or selecting entire sets of outputs from different speech recognition engines based on a predetermined ranking process. However, the low-level combinations of outputs from multiple speech recognition systems do not preserve high-level linguistic information. In other embodiments, multiple speech recognition engines generate full speech recognition results, but the determination process of which speech recognition result to select in the outputs of multiple speech recognition engines is also a challenging problem. Consequently, improvements to speech recognition systems that improve the accuracy of selection of speech recognition results from a set of candidate speech recognition results from multiple speech recognition engines would be beneficial.

As used herein, the term "speech recognition engine" refers to a data model and executable program code that enable a computerized system to identify spoken words from an operator based on recorded audio input data of the spoken words that are received via a microphone or other audio input device. Speech recognition systems often include a lower-level acoustic model that recognizes the individual sounds of human speech in a sound recording and higher-level language models that recognize words and sentences based on sequences of the sounds from the acoustic model for a predetermined language. Speech recognition engines that are known to the art typically implement one or more statistical models such as, for example, a hidden Markov model (HMM), support vector machine (SVM), trained neural network, or another statistical model that generates statistical predictions for recorded human speech using a plurality of trained parameters that are applied to a feature vector of input data that corresponds to the human speech. The speech recognition engine generates the feature vector using, for example, various signal processing techniques that are known to the art that extract properties ("features") of the recorded speech signal and organize the features into a one-dimensional or multi-dimensional vector that can be processed using the statistical model to identify various parts of speech including individual words and sentences. Speech recognition engines can produce results for speech inputs corresponding to individual spoken phonemes and more complex patterns of sounds including spoken words and sentences that include sequences of related words.

As used herein, the term "speech recognition result" refers to a machine-readable output that the speech recognition engine generates for a given input. The result can be, for example, text encoded in a machine-readable format or another set of encoded data that serve as inputs to control the operation of an automated system. Due to the statistical nature of speech recognition engines, in some configurations the speech engine generates multiple potential speech recognition results for a single input. The speech engine also generates a "confidence score" for each speech recognition result, where the confidence score is a statistical estimate of the likelihood that each speech recognition result is accurate based on the trained statistical model of the speech recognition engine. As is described in more detail below, a hybrid speech recognition system uses speech recognition results that are produced by multiple speech recognition engines, generates additional hybrid speech recognition results, and finally produces at least one output speech recognition result based on the plurality of previously generated speech recognition results. As used herein, the term "candidate speech recognition result" or more simply "candidate result" refers to a speech recognition result that is a candidate to be the final speech recognition result from the hybrid speech recognition system that produces multiple candidate results and selects only a subset (typically one) of the results as the final speech recognition result. In various embodiments, candidate speech recognition results include both the speech recognition results from general-purpose and domain-specific speech recognition engines and hybrid speech recognition results that a system generates using words from multiple candidate speech recognition results.

As used herein, the term "general-purpose speech recognition engine" refers to a type of speech recognition engine that is trained to recognize a broad range of speech from a natural human language such as English, Chinese, Spanish, Hindi, etc. The general-purpose speech recognition engines generate speech recognition results based on a broad vocabulary of words and a language model that is trained to widely cover linguistic patterns in a natural language. As used herein, the term "domain-specific speech recognition engine" refers to a type of speech recognition engine that is trained to recognize speech inputs in a particular area of use or "domain" that often includes a somewhat different vocabulary and potentially different expected grammatical structures from broader natural languages. The vocabulary for a specific domain typically includes some terms from a broader natural language but may include a narrower overall vocabulary and in some instances includes specialized terms that are not officially recognized as official words in a natural language but are well-known to a particular domain. For example, in a navigation application a domain-specific speech recognition may recognize terms for roads, towns, or other geographic designations that are not typically recognized as proper names in a more general language. In other configurations, a particular domain uses a particular set of jargon that is useful for a particular domain but may not be well recognized in a broader language. For example, aviators officially use English as a language for communication but also employ a large number of domain-specific jargon words and other abbreviations that are not part of Standard English.

As used herein, the term "trigger pair" refers to two words, each of which can either be a word (e.g., "play") or a predetermined class (e.g., <Song Name>) representing a word sequence (e.g., "Poker Face") that falls within the predetermined class, such as the proper name of a song, person, location name, etc. Words in the trigger pair that, when appearing in a specific order within words in the sentence text content of a speech recognition result, have a high level of correlation between the appearance of a later word B in situations where an earlier word A is observed in audio input data for a trigger pair of A→B. As described in more detail below, after identification of a set of trigger pairs via a training process, the occurrences of trigger word pairs in the text of candidate speech recognition results forms a portion of a feature vector for each candidate result that a ranking process uses to rank different candidate speech recognition results.

This disclosure provides an improvement to our previous work in re-ranking multiple hypotheses generated by Automatic Speech Recognition (ASR) engines for a speech utterance using deep feedforward neural network, as identified by U.S. Pat. No. 10,170,110, the entire disclosure is incorporated by reference herein. In that previous work, the ranking framework utilizes a relatively simple neural network structure that extracts features directly from the ASR results. Here, we refine the neural network structure of the ranking framework, and enhance the ranking framework with NLU information in at least two aspects. In one aspect, NLU information (e.g., slot/intent information) is included to facilitate the ranking of an ASR hypotheses. The NLU information fed into the neural network not only includes those calculated from the ASR information, but also involves NLU related features, such as slot-based trigger features and semantic features representing slot/intent-sensitive sentence embedding. The framework also jointly trains the ranking task with intent detection, with the goal of using the intent information to help distinguish among the hypotheses. In another aspect, the framework outputs not only the top-ranked hypothesis as new ASR result but also NLU results (i.e., the slot filling result and intent detection result). Such that in a spoken dialogue system (SDS), the dialogue management component can directly conduct subsequent processing based on the outputs of the proposed ranking framework, resulting in the application of the framework convenient in a SDS. Experimental data was gathered from an in-car infotainment system, ranking competing hypotheses generated by three different ASR engines. The results of the experiments were encouraging, in which the system illustrated the effectiveness of the proposed ranking framework. Experiments also illustrated that both incorporating NLU related features and joint training with intent detection increases accuracy the ranking of ASR hypotheses.

Improvements to ASR can be made in various directions, such as refining acoustic/language model and adopting end-to-end schema. Among these directions, post-processing the hypotheses generated by ASR engine(s) has been a popular choice, mainly because it is much more convenient to apply linguistic knowledge to ASR hypotheses than to the decoding search space. Some post-processing methods construct certain confusion networks from the ASR hypotheses and then distinguish among competing words with the aid of acoustic/linguistic knowledge. Many previous works rescore and rank ASR hypotheses using various advanced language models or discriminative models. Pairwise classification based ranking approaches has also been proposed using support vector machine or neural network encoder based classifier. From the aspect of knowledge usage, previous ASR approaches utilize only limited linguistic knowledge, mainly modeling word sequence or extracting features directly from word sequences. Here, NLU information, such as slots and intents, can be shown to improve ASR.

This disclosure illustrates a new neural network framework to rank multiple hypotheses for one utterance. Instead of scoring each hypothesis one by one or comparing two hypotheses at a time before ranking, the framework uses all competing hypotheses as input and predicts the ranking of them simultaneously. The framework makes use of NLU knowledge to facilitate the ranking by modeling with slot/intent relevant features and joint training with intent detection.

FIG. 1 depicts an in-vehicle information system 100 that includes a display such as a head-up display (HUD) 120, or one or more console LCD panels 124, one or more input microphones 128, and one or more output speakers 132. The LCD display 124 and HUD 120 generate visual output responses from the system 100 based, at least in part, upon speech input commands that the system 100 receives from an operator or other occupant of the vehicle. A controller 148 is operatively connected to each of the components in the in-vehicle information system 100. In some embodiments, the controller 148 connects to or incorporates additional components, such as a global positioning system (GPS) receiver 152 and a wireless network device 154 such as a modem, to provide navigation and communication with external data networks and computing devices.

In some operating modes, the in-vehicle information system 100 operates independently, while in other operating modes, the in-vehicle information system 100 interacts with a mobile electronic device 170, such as a smartphone, tablet, notebook computer, or other electronic device. The in-vehicle information system communicates with the smartphone 170 using a wired interface, such as USB, or a wireless interface such as Bluetooth. The in-vehicle information system 100 provides a speech recognition user interface that enables the operator to control the smartphone 170 or another mobile electronic communication device using spoken commands that reduce distraction while operating the vehicle. For example, the in-vehicle information system 100 provides a speech interface to enable a passenger of the vehicle such as the vehicle operator, to make phone calls, or send text messages, with the smartphone 170 without requiring the operator/passenger to hold or look at the electronic device smartphone 170. In some embodiments, the in-vehicle system 100 provides a speech interface to the electronic device 170 such that the electronic device can launch applications on the smartphone 170 and then both navigate the application and enter data into the application based on speech interface. In other embodiments, the in-vehicle system 100 provides a speech interface to the vehicle such that the operation of the vehicle can be adjusted based on the speech interface. For example, the speech interface can adjust the ride level (powertrain operation, transmission operation, and chassis/suspension operation) such that the vehicle transitions from a comfort to a sport mode of operation. In other embodiments, the smartphone 170 includes various devices such as GPS and wireless networking devices that complement or replace the functionality of devices that are housed in the vehicle.

The microphone 128 generates audio data from spoken input received from the vehicle operator or another vehicle passenger. The controller 148 includes hardware, such as microprocessors, microcontrollers, digital signal processors (DSPs), single instruction multiple data (SIMD) processors, application specific integrated circuits (ASICs), or other computational system which process the audio data, and software components to convert the input signals from the microphone 128 into audio input data. As set forth below, the controller 148 uses at least one general-purpose and at least one domain-specific speech recognition engine to generate candidate speech recognition results based on the audio input data and the controller 148 further uses a ranker and a natural language understanding module to improve the accuracy of the final speech recognition result output. Additionally, the controller 148 includes hardware and software components that enable generation of synthesized speech or other audio output through the speakers 132.

The in-vehicle information system 100 provides visual feedback to the vehicle operator using the LCD panel 124, the HUD 120 that is projected onto the windshield 102, and through gauges, indicator lights, or additional LCD panels that are located in the dashboard 108. When the vehicle is in motion, the controller 148 optionally deactivates the LCD panel 124 or only displays a simplified output through the LCD panel 124 to reduce distraction to the vehicle operator. The controller 148 displays visual feedback using the HUD 120 to enable the operator to view the environment around the vehicle while receiving visual feedback. The controller 148 typically displays simplified data on the HUD 120 in a region corresponding to the peripheral vision of the vehicle operator to ensure that the vehicle operator has an unobstructed view of the road and environment around the vehicle.

As described above, the HUD 120 displays visual information on a portion of the windshield 120. As used herein, the term "HUD" refers generically to a wide range of head-up display devices including, but not limited to, combined head up displays (CHUDs) that include a separate combiner element, and the like. In some embodiments, the HUD 120 displays monochromatic text and graphics, while other HUD embodiments include multi-color displays. While the HUD 120 is depicted as displaying on the windshield 102, in alternative embodiments a head up unit is integrated with glasses, a helmet visor, or a reticle that the operator wears during operation.

The controller 148 includes one or more integrated circuits configured as one or a combination of a central processing unit (CPU), graphical processing unit (GPU), microcontroller, field programmable gate array (FPGA), application specific integrated circuit (ASIC), digital signal processor (DSP), or any other suitable digital logic device. The controller 148 also includes a memory, such as a solid state such (e.g., random access memory (RAM), read only memory (ROM), etc.), magnetic data storage device, or other structure used to store programmed instructions for operation of the in-vehicle information system 100.

During operation, the in-vehicle information system 100 receives input requests from multiple input devices, including speech input commands that are received through the microphone 128. In particular, the controller 148 receives audio input data corresponding to speech from a user via the microphone 128.

The controller 148 includes one or more integrated circuits configured as a central processing unit (CPU), microcontroller, field programmable gate array (FPGA), application specific integrated circuit (ASIC), digital signal processor (DSP), or any other suitable digital logic device. The controller 148 is also operatively connected to a memory 160, which includes a non-volatile solid state or magnetic data storage device or a volatile data storage device such as random access memory (RAM), which stores programmed instructions for operation of the in-vehicle information system 100. The memory 160 stores model data and executable program instruction code to implement multiple speech recognition engines 162, implement a feature extractor 164, a natural language understanding unit 166 and a deep neural network ranker 168. The speech recognition engines 162 are trained using a predetermined training process and the speech recognition engines 162 are otherwise known to the art. While the embodiment of FIG. 1 includes elements that are stored within the memory 160 of the system 100 within a motor vehicle, in some embodiments an external computing device, such as a network connected server, implements some or all of the features that are depicted in the system 100. Thus, those of skill in the art will recognize that any reference to the operation of the system 100 including the controller 148 and the memory 160 should further include the operations of server computing devices and other distributed computing components in alternative embodiments of the system 100.

In the embodiment of FIG. 1, the feature extractor 164 is configured to generate a word-sequence feature with a plurality of numeric elements that correspond to the contents of each candidate speech recognition result, including the speech recognition results that are generated by one of the speech recognition engines 162 or hybrid speech recognition results that combine words from two or more of the speech recognition engines 162. Also, the feature extractor 164 is also configured to generate a natural language understanding feature by the natural language understanding unit 166. The feature extractor 164 generates a word-sequence feature that includes elements for any one or a combination of the following features: (a) trigger pairs, (b) confidence scores, and (c) individual word-level features including bag-of-words with decay features.

Figure 2:
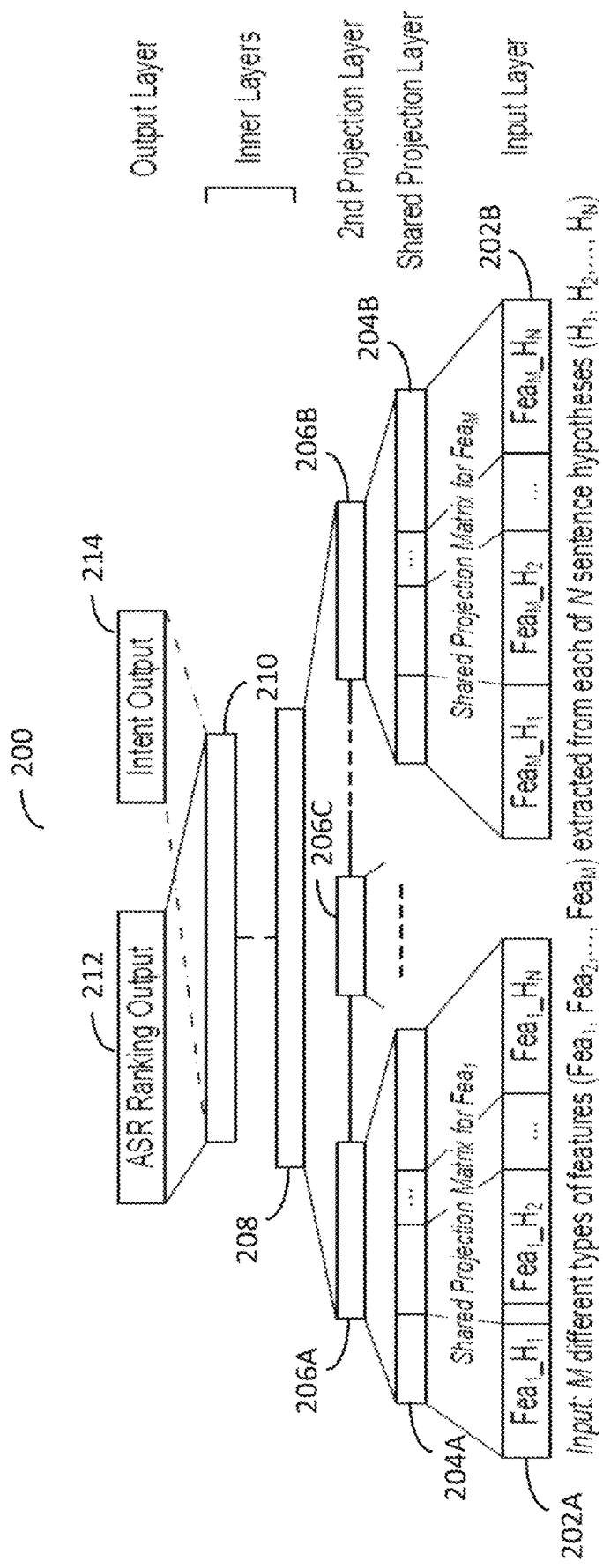
FIG. 2 is an illustration of a framework to rank hypotheses generated by an ASR engine for a speech utterance.

FIG. 2 is an illustration of a framework 200 to rank hypotheses generated by an ASR engine for a speech utterance. Here, a new framework using a deep feedforward neural network to rank competing hypotheses generated by one or more ASR engines, with the aid of NLU relevant features, outputting not only the top-ranked hypothesis as the new ASR result but also the corresponding NLU results (i.e., intent detection result and the slot filling result).

The proposed framework is a deep feedforward neural network, which receives inputs from N (N=10 in our system) competing hypotheses generated by one or more ASR engines for a speech utterance, and predicts the ranking result for those hypotheses, optionally together with the intent detection result. The overall structure is illustrated in FIG. 1.

Features extracted from the hypotheses are fed into the input layer with the same type of features from different hypotheses concatenated together to facilitate the learning. For one feature type, hundreds or more features may be extracted from each hypothesis. We use two projection layers to handle such features. Per feature type, a shared projection matrix is first used to project the features from each hypothesis into a smaller space, and then a 2nd regular project layer is used to project those spaces from all hypotheses into an even more condense representation. The achieved representation for each type of features are then concatenated and fed into the inner layers, which are fully-connected feedforward layers. In case that a feature type may only generate one or a few features per hypothesis, such as the confidence score feature, we simply omit the projection layers for that feature type and directly feed the corresponding features extracted from all hypotheses into the inner layers, by concatenating these features with the 2nd project layer for other feature types.

The output layer contains two parts, one major part predicting the ranking results for the input hypotheses and another optional part predicting intent detection result. The major part contains N output nodes, which are corresponding to the N input hypotheses in the same order. Softmax activation is used to generate the output values, and the hypotheses are then ranked based on the values accordingly. To effectively rank the hypotheses, we use the soft target values similar to those described in U.S. Pat. No. 10,170,110 (instead of one-hot values) for training as, $$target_i = \frac{e^{-d_i}}{\sum_{i=0}^{n} e^{-d_i}} \qquad (1)$$

in which di is the Levenshtein distance of the $i^{th}$ hypothesis from the reference sentence. With this definition, the target distribution reserves the ranking information of the input hypotheses, generating a higher score for an output node if the corresponding input hypothesis contains less ASR errors. By minimizing the Kullback-Leibler Divergence loss, the output distribution approximates the target distribution.

The "intent output" part in the output layer is optional. When intents are available as in our experiments, it could be beneficial to jointly train the ranking task and intent detection, since the intent information may help distinguish among the hypotheses. For the intent related output, the nodes are corresponding to possible intents, assigned with one-hot target values (1 for the reference intent and 0 for others) and trained with cross-entropy loss. When intent output is utilized (as in our system), we jointly train the network, back-propagating the costs from both the ASR ranking part and the intent related part to the lower layers.

In this system, there are four main types of features that are extracted from each input hypothesis; a trigger feature, a Bag of Words (BOW) feature, a Bidirectional Long Short-Term Memory (BLSTM) feature, and a confidence feature.

Trigger features are used to model long/flexible-distance constraints. Similar to U.S. Pat. No. 10,170,110, we define triggers as a pair of linguistic units that are significantly correlated in a same sentence, where a linguistic unit could be a word or a slot (i.e., <song name>). A trigger pair (e.g., "play"<song name>) captures the dependencies between the two units no matter how far they may be apart in a sentence. Given a collected text corpus in the domain of interest, we first process it by using the slots to replace corresponding text (e.g., using <song name> to replace "Poker Face"). We then calculate the mutual information (MI) scores of all possible trigger pairs A→B based on equation 2 below, $$MI(A:B) = P(A, B)\log\frac{P(B|A)}{P(B)} + P(A, \overline{B})\log\frac{P(\overline{B}|A)}{P(\overline{B})} + \qquad (2)$$
$$P(\overline{A}, B)\log\frac{P(B|\overline{A})}{P(B)} + P(\overline{A}, \overline{B})\log\frac{P(\overline{B}|\overline{A})}{P(\overline{B})}$$

in which $\overline{A}/\overline{B}$ refers to the event that A/B does not appear in a sentence. The top n trigger pairs with highest MI scores are then selected as trigger features.

Next, the feature extraction of trigger features is extended by utilizing a NLU module to robustly identify slots in each hypothesis for the extraction of word/slot trigger pairs. When extracting trigger features from a hypothesis, a standalone NLU module is used to detect the slots in that hypothesis. The value of a trigger feature is 1 if the trigger pair appears in the hypothesis, and 0 otherwise.

The BOW feature includes the definition from U.S. Pat. No. 10,170,110. Given a dictionary, a vector of BOW features is calculated for each hypothesis using the following equation (3), $$\text{bow}_{decay} = \Sigma_{i=0}^{K} \gamma^i \vec{w}_i \qquad (3)$$

in which K is the number of words in the hypothesis and $\vec{w}_i$ is the one-hot representation of the i-th word in the hypothesis. $\gamma \in [0,1]$ is a decaying factor, set as 0.9.

The BLSTM feature is new, related to NLU property of each hypothesis. Note that the NLU module used in the extraction of trigger features utilizes bidirectional LSTM RNN to encode each hypothesis as described in FIG. 4, in which the last states of both the forward and backward Recurrent Neural Network (RNN) cover information of entire hypothesis. We concatenate the two last states into a sentence embedding vector, referred to as the BLSTM features. Since the NLU module is a joint model of intent detection and slot filling, the BLSTM features are intent-sensitive.

The confidence feature includes the definition from U.S. Pat. No. 10,170,110. A sentence-level confidence score is assigned by an ASR engine to each hypothesis that is directly fed into the inner layers. It is noted that various ASR engines may produce confidence scores using different distributions. When the input hypotheses are generated by different ASR engines, application of a linear regression method may be used to align the confidence scores into a same space, and then use the aligned score as the confidence feature.

Figure 3:
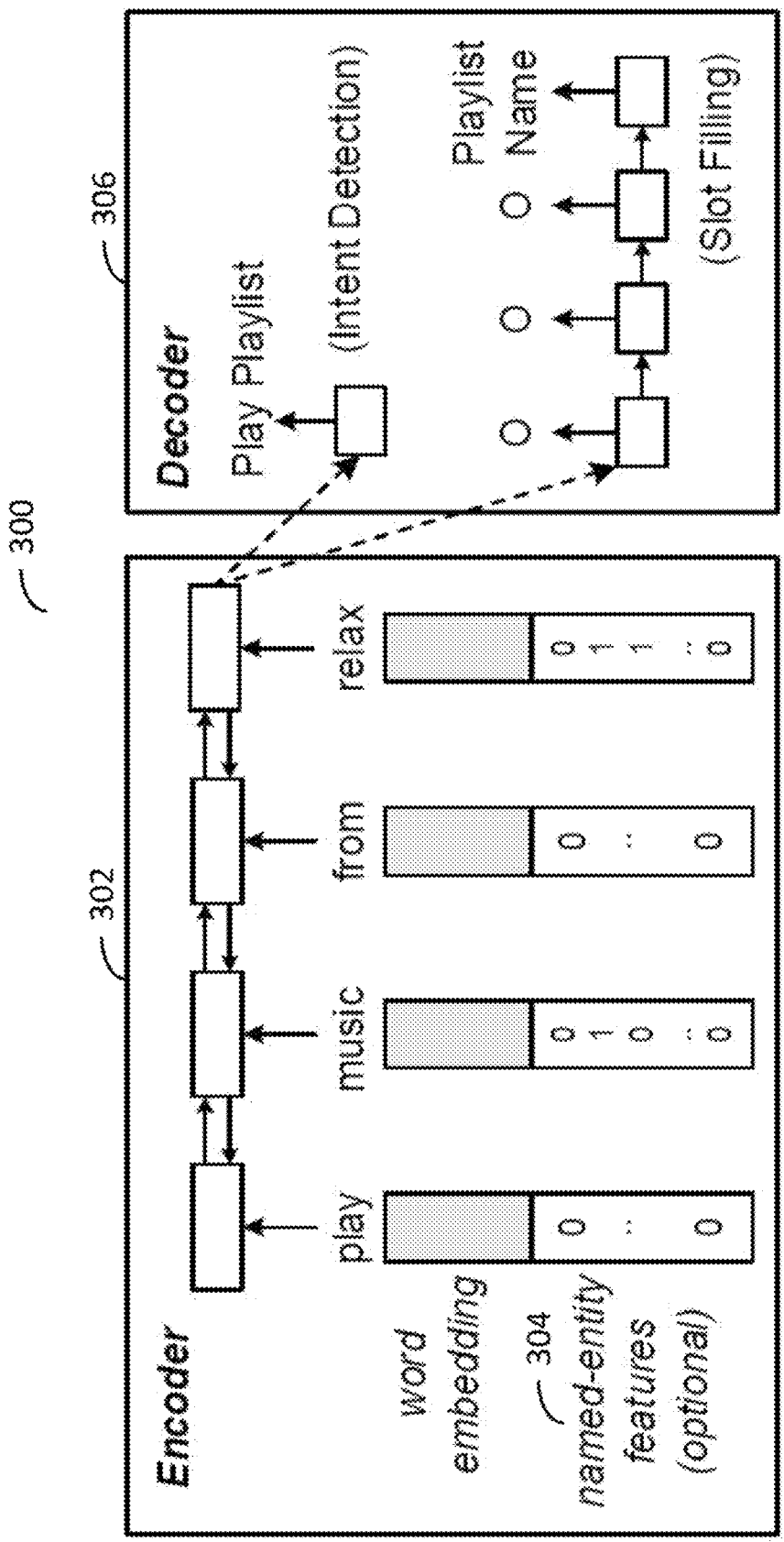
FIG. 3 is a block diagram for a standalone encoder/decoder natural language understanding (NLU) module.

FIG. 3 is a block diagram for a standalone natural language understanding (NLU) module 300 utilizing an encoder/decoder neural network structure. The standalone NLU module used in feature extraction as well as in the evaluation later is implemented using a state-of-the-art approach that jointly models slot filling and intent detection. The module may adopt a RNN based encoder-decoder structure, using LSTM as the RNN unit. Pre-trained word embedding vector for each input word can be fed into the encoder 302. We further enhance the input vector by appending named-entity features 304 to it, when predefined name lists are available. The aim is to use the added name information to facilitate learning, especially for the case when the training data is of limited size and many names occur only a few times or are unseen in it. For the named-entity features, each of them is corresponding to one name list, set as 1 if the input word is part of a name in that list and 0 otherwise. For the example shown in FIG. 3, the word "relax" is both a song name and playlist name, so that the two corresponding features are set as 1 in the named-entity vector 304. Using this information together with the context knowledge captured by the RNN, the NLU module may identify "relax" as a playlist name even if the name "relax" is unseen in the training data. Based on hidden representations generated by the encoder 302 for a given input sentence, the decoder 306 then generates NLU results for the given sentence, predicting the intent of the sentence as well as detecting slots in the sentence.

An in-car infotainment system utilizing multiple different types of ASR engines was used to evaluate the framework for ranking hypotheses generated by multiple engines. The in-car infotainment system included vehicle control systems such as driver assistance systems. The speech training/tuning/testing sets were recorded in car with relatively low noise conditions from multiple speakers with balanced gender, containing 9166, 1975, and 2080 utterances respectively. Each utterance was decoded by two domain-specific ASR engines (using grammar and statistical language model respectively, trained on separate in-domain datasets) and a general cloud engine. The three engines (two domain-specific ASR engines and one cloud ASR engine) have complementary strengths for decoding. The process included feeding the top-best hypothesis from each engine into the proposed framework to rank and voiding the space for extra hypotheses allowed in the input layer by setting related features as 0. Most names involved in this system were from 16 name lists, some of which were large (e.g., the song-name list contains 5232 entries). 40 slot labels (including phone number, frequency, etc. along with items that have no predefined list) were created following an IOB schema although other labeling methods can be used and 89 distinct intents (e.g., "tune radio frequency") were used.

The standalone NLU module was trained with the reference sentences. GloVe: Global Vectors for Word Representation version 100d was used as word embedding for each input word. The named-entity vector was constructed based on the given name lists. The NLU module was trained, however the attention mechanism was not used due to its limited benefit observed on ASR hypotheses and efficiency consideration.

Trigger features were selected based on an additional text set of 24836 in-domain sentences for infotainment data, and 850 trigger features were utilized. Regarding the BOW feature, the dictionary was defined as the 90% of the most frequent words in training references, along with an entry for out-of-vocabulary words, and the alignment of confidence scores was applied.

In the ranking framework, each shared projection matrix projected the corresponding features into a space of 50 nodes. Providing a layer of size 50*10*3 (500 nodes for trigger, BOW, and BLSTM features respectively), which was further projected to a smaller 2nd projection layer (200*3 nodes). This second project layer was then concatenated with 10 confidence features to feed to the input layers. Four inner layers were used (500, 200, 100 and 100 nodes, respectively), with the inner layers using an activation function such as a ReLU activation function and batch normalization applied to each layer. We adopted Adam optimization to train the model in batches. Early stopping is conducted when the loss on the tuning set fails to improve for the last 30 iterations. The model achieving the best performance on tuning data was then used in evaluation. And the hyper-parameters were selected empirically.

In an exemplary standalone NLU module, feeding the named-entity features into the encoder was beneficial. In a system the intent detection error rate was reduced from 9.12% to 5.17% and while raising the slot filling F1 score from 64.55 to 90.68 on testing references. This indicates that the name information introduced effectively relieves the difficulty in learning when using large name lists and limited training data.

For the ranking framework, we first train a framework using only ASR ranking output, referred to as the ASR-alone framework, and then train a joint framework using both ASR ranking and intent outputs. The evaluation results of the two frameworks are included in Table 1.

TABLE 1

Results on in-car infotainment testing data.

|  | WER % | Intent Error % | Slot F1 |
| --- | --- | --- | --- |
| Oracle hypo. + NLU | 3.87 | 7.84 | 84.51 |
| Top-scored hypo. + NLU | 7.56 | 11.37 | 79.73 |
| ASR-alone Framework | 7.05 | 10.49 | 79.82 |
| Joint Framework | 6.69 | 10.00 | 80.50 |

In Table 1, "Oracle hypo." and "Top-scored hypo." refer to the hypothesis with the lower word error rate (WER) and highest (aligned) confidence score, respectively, among competing hypotheses. "+NLU" denotes the procedure that applies the standalone NLU module to a hypothesis to get NLU results (i.e., slot filling F1 score and intent detection error rate). Both WER and NLU results were evaluated, as for the ranking framework, each input hypothesis is processed by the NLU module during feature extraction, obtaining its NLU results. When the framework predicts the top-ranked hypothesis, it also retrieves the NLU results associated with that hypothesis. Note that for the joint framework, the intent related output also predicts an intent. However it was noticed that this predicted intent performs worse than the intent assigned to the top-ranked hypothesis, possibly due to the confusion introduced by competing hypotheses, thus the later was chosen as the intent result.

Table 1 shows that the ASR-alone framework brings a 6.75% relative reduction in WER over the "top-scored hypo." baseline (i.e., the performance of ranking hypotheses based on aligned confidence score only), which outperforms each individual engine's performance. The joint framework enlarges the benefit to 11.51% relative WER reduction. For NLU results, similar improvements are achieved.

Experiments also show that for the framework, adopting the proposed soft target values for ranking is important. For example, when replacing the soft target values with one-hot values, the WER obtained by the joint model rises to 7.21%. It was also observed that all the four types of features are beneficial for the in-car infotainment data, deleting each one will lead to worse performances. For example, removing the slot-based trigger features from the joint framework increases the WER of the resulting model to 7.28%.

In the system 100, the trigger pairs that are stored in the feature extractor 164 each include a predetermined set of two linguistic items, each of which can be either a word or a slot detected by the standalone NLU module 300. The two items for each trigger pair have been previously identified as having a strong correlation in sentences from a training corpus that represents the text transcripts of expected speech inputs. A first trigger item has a strong statistical likelihood of being followed by a second trigger item in the trigger pair in speech input, although the items may be separated by an indeterminate number of intermediate words in different speech inputs. Thus, if a speech recognition result includes the trigger items, the likelihood of those trigger words in the speech recognition result being accurate is comparatively high due to the statistical correlation between the first and second trigger items. In the system 100, the trigger items are generated based on a mutual information score using statistical methods that are known to the art. The memory 160 stores a predetermined set of N trigger pair elements in the feature vector that correspond to trigger pairs with high correlation levels between the first item and the second item based on sets of trigger items with high mutual information scores. As described below, the trigger pairs provide additional features of speech recognition results to the neural network ranker 168 that enables the neural network ranker 168 to rank the speech recognition results using additional linguistic knowledge that goes beyond the word sequence information that is present in the speech recognition result.

The confidence score features correspond to numeric confidence score values that the speech recognition engines 162 generate in conjunction with each candidate speech recognition result. For example, in one configuration a numeric value in the range of (0.0, 1.0) indicates a probabilistic confidence level that a speech recognition engine places in the accuracy of a particular candidate speech recognition result from lowest confidence (0.0) to highest confidence (1.0). Each of the hybrid candidate speech recognition results that are generated by one or more speech recognition engines is assigned a confidence score. When a speech recognition engine generates a speech recognition result, it also assigns a confidence score to it.

In the system 100, the controller 148 also normalizes and whitens confidence score values for speech recognition results that are generated by different speech recognition engines to generate the final feature vector elements including normalized and whitened confidence scores that are uniform between the outputs of the multiple speech recognition engines 162. The controller 148 normalizes the confidence scores from difference speech recognition engines using a normalization procedures, and then whitens the normalized confidence score values according to the mean and variance estimated on the training data using a prior-art whitening technique. In one embodiment, the controller 148 normalizes the confidence scores between different speech recognition engines using a linear regression process. The controller 148 first subdivides the confidence score ranges into a predetermined number of subdivisions or "bins", such as twenty unique bins for the two speech recognition engines A and B. The controller 148 then identifies the actual accuracy rates for various speech recognition results that correspond to each bin of scores based on the observed speech recognition results and the actual underlying inputs that were used during the training process prior to the process. The controller 148 performs a clustering operation of the confidence scores within predetermined numeric windows around "edges" that separate bins for each set of results from the different speech recognition engines and identifies an average accuracy score that corresponds to each edge confidence score value. The "edge" confidence scores are uniformly distributed along the confidence score range of each speech recognition engine and provide a predetermined number of comparison points to perform a linear regression that maps the confidence scores of a first speech recognition engine to confidence scores of another speech recognition engine that have similar accuracy rates.

The controller 148 uses the identified accuracy data for each edge score to perform a linear regression mapping that enables the controller 148 to convert a confidence score from a first speech recognition engine to another confidence score value that corresponds to an equivalent confidence score from a second speech recognition engine. The mapping of one confidence score from a first speech recognition engine to another confidence score from another speech recognition is also referred to as a score alignment process and in some embodiments the controller 148 determines an alignment of a confidence score from a first speech recognition engine with a second speech recognition engine using the following equation:

$$x' = e'_i + \frac{(x - e_i)}{(e_{i+1} - e_i)}(e'_{i+1} - e'_i) \qquad (4)$$

in which x is the score from the first speech recognition engine, x' is the equivalent value of x within the confidence score range of the second speech recognition engine, the values $e_i$ and $e_{i+1}$ correspond to the estimated accuracy scores for different edge values that are nearest to the value x for the first speech recognition engine (e.g. the estimated accuracy scores for edge values 20 and 25 around a confidence score of 22) and the values $e_i'$ and $e_{i+1}'$ correspond to the estimated accuracy scores at the same relative edge values for the second speech recognition engine.

In some embodiments, the controller 148 stores the results of the linear regression in the feature extractor 164 within the memory 160 as a lookup table or other suitable data structure to enable efficient normalization of confidence scores between the different speech recognition engines 162 without having to regenerate the linear regression for each comparison.

The controller 148 also uses the feature extractor 164 to identify word-level features in the candidate speech recognition results. The word-level features correspond to data that the controller 148 places into elements of a feature vector that correspond to the characteristics of individual words within the candidate speech recognition results. In one embodiment, the controller 148 merely identifies the presence or absence of a plurality of predetermined in-vocabulary words that correspond to individual elements of a predetermined feature vector within each candidate speech recognition result. For example, if the word "street" occurs at least once in the candidate speech recognition result, then the controller 148 sets the value of the corresponding element in the feature vector as 1 during the feature extraction process. In another embodiment, the controller 148 identifies the frequency of each word, where "frequency" as used herein refers to the number of times that a single word occurs within a candidate speech recognition result. The controller 148 places the number of occurrences of the word in the corresponding element of the feature vector.

In still another embodiment, the feature extractor 164 generates a "bag-of-words with decay feature" for the element in the feature vector corresponding to each word in a predetermined vocabulary. The term "bag-of-words with decay" feature as used herein refers to a numeric score that the controller 148 assigns to each word in the predetermined vocabulary given a candidate speech recognition result based on the occurrence times and positions of the word within the result. The controller 148 generates the bag-of-words with decay score for each word in the candidate speech recognition result that is within the predetermined vocabulary, and assign the bag-of-words with decay score as zero for those in-vocabulary words that not occur in the candidate result. In some embodiments, the predetermined vocabulary includes a special entry to represent any out-of-vocabulary words, and the controller 148 also generates a single bag-of-words with decay score for the special entry based on all the out-of-vocabulary words within the candidate result. For a given word $w_i$ in a predetermined dictionary, the bag of words with decay score may be expressed as equation 2 above or equation 6 below, $$\text{bow}_i = \Sigma_{p \in P'(w_i)} \gamma^p \qquad (6)$$

In which $P'(w_i)$ is the set of positions in the candidate speech recognition result where the word $w_i$ occurs and the term $\gamma$ is a predetermined numeric decay factor in a range of (0, 1.0) that is, for example, set to 0.9 in the illustrative embodiment of the system 100.

Referring back to FIG. 1, in the embodiment of FIG. 1, the neural network ranker 168 is a trained neural network including an input layer of neurons that receive a plurality of feature vectors corresponding to a predetermined number of candidate speech recognition results and an output layer of neurons that generate ranking scores corresponding to each of the input feature vectors. In general, neural networks include a plurality of nodes that are referred to as "neurons". Each neuron receives at least one input value, applies a predetermined weighting factor to the input value where different input values often receive different weighting factors, and generates an output as a sum of the weighted inputs with an optional bias factor added to the sum in some embodiments. The precise weighting factors for each input and the optional bias value in each neuron are generated during a training process that is described in more detail below. An output layer of the neural network includes another set of neurons that are specifically configured with an "activation function" during a training process. The activation function is, for example, a sigmoid function or other threshold function that produces an output value based on the inputs from a final hidden layer of neurons in the neural network where the precise parameters of the sigmoid function or threshold values are generated during a training process of the neural network.

In the specific configuration of FIG. 1, the neural network ranker 168 may include a feed-forward deep neural network. As is known in the art, a feed-forward neural network includes layers of neurons that are connected in a single direction proceeding from an input layer to an output layer without any recurrence or "feedback" loops that connect neurons in one layer of the neural network to neurons in a previous layer of the neural network. A deep neural network includes at least one "hidden layer" (and typically more than one hidden layer) of neurons that are not exposed as either the input layer or the output layer. For example, a plurality of k hidden layers of neurons may be used to connect the input layer to the output layer.

Considering FIG. 2, In an embodiment of the neural network 200, the input layer further includes a projection layer 204A, 204B that applies predetermined matrix transformations to selected sets of input feature vector elements 202A, 202B, including two different projection matrices for the word-sequence features such as trigger pair feature elements, BOW feature elements, BLSTM feature elements, and the word-level feature elements respectively. The projection layer 204 generates a simplified representation of the outputs of the input neurons in the input layer 202 because in most practical inputs, the feature vector elements for the word-sequence features are "sparse", which means that each candidate speech recognition result only includes a small number (if any) of the trigger pair terms and a small number of words in a large overall set of words (e.g. 10,000 words) that are encoded in the structure of the feature vector. The transformations in the projection layer 204 enables the remaining layers of the neural network to include fewer neurons while still generating useful ranking scores for the feature vector inputs of the candidate speech recognition results. In one illustrative embodiment, the two projection matrices $P_f$ for trigger word pairs and $P_w$ for word-level features each project the corresponding input neurons into a smaller vector space with 200 elements each, which produces a projected layer of 401 neurons (one neuron being reserved for the confidence score feature) for each of the n input feature vectors in the neural network ranker 168.

During operation, the system 100 receives audio input data using the microphone 128 and uses the multiple speech engines 162 to generate a plurality of candidate speech recognition results, including hybrid speech recognition results that include words selected from two or more of the candidate speech recognition results in some embodiments. The controller 148 extracts features from the candidate speech recognition results using the feature extractor 164 to generate the feature vectors from the candidate speech recognition results, and provides the feature vectors to the neural network ranker 168 to generate output scores for each feature vector. The controller 148 then identifies the feature vector and candidate speech recognition result that corresponds to the highest ranking score, and the controller 148 operates the automated system using the candidate speech recognition result in the plurality of candidate speech recognition results corresponding to a highest ranking score in the plurality of ranking scores as input.

Figure 4:
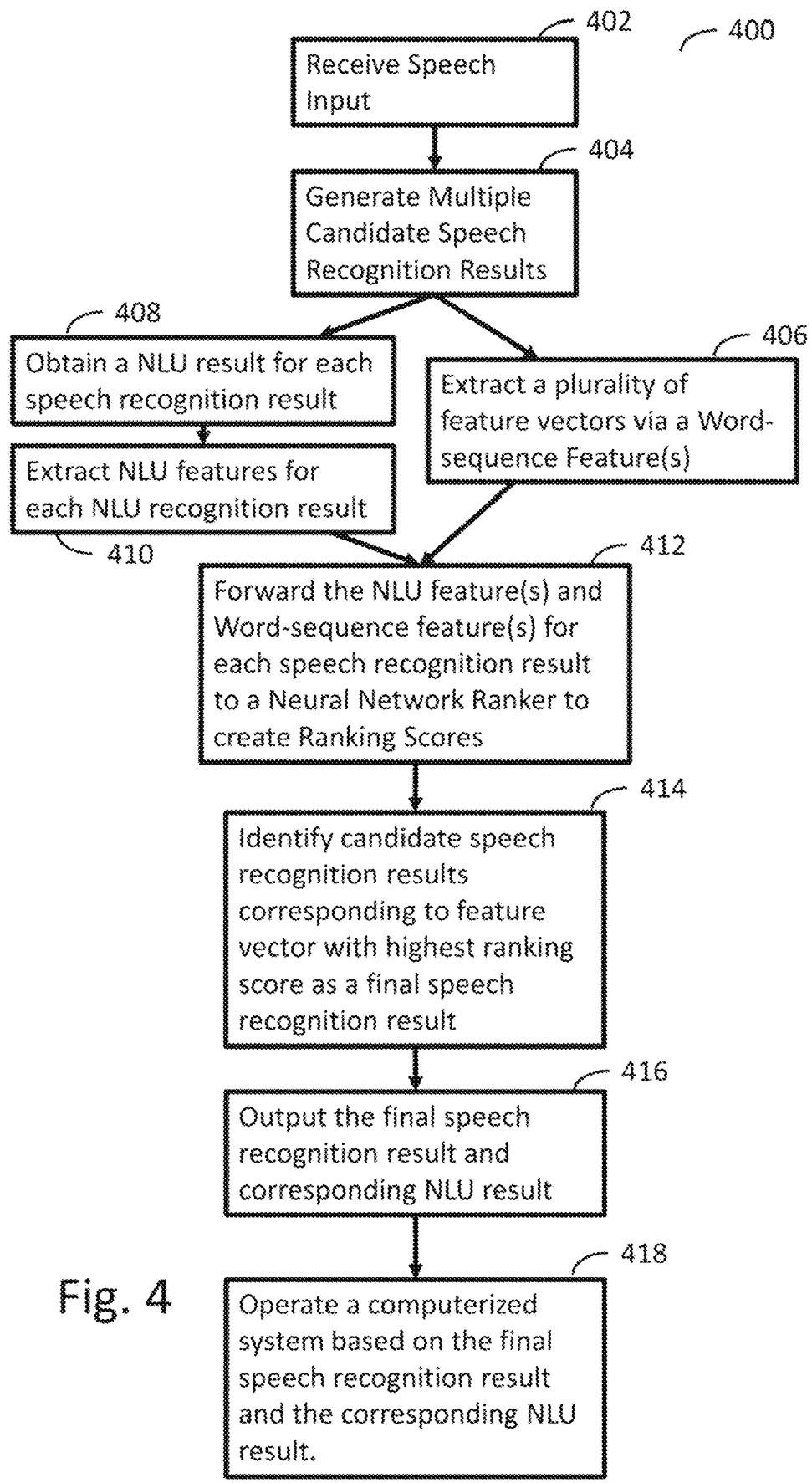
FIG. 4 is a flow diagram of process to perform speech recognition to operate a computerized system.

FIG. 4 depicts a process 400 for performing speech recognition using multiple speech recognition engines and a neural network ranker to select a candidate speech recognition result. In the description below, a reference to the process 400 performing a function or action refers to the operation of a controller to execute stored program instructions to perform the function or action in association with other components in the automated system. The process 400 is described in conjunction with the system 100 of FIG. 1 for illustrative purposes.

The process 400 begins as the system 100 generates multiple candidate speech recognition results using the multiple speech recognition engines 162 (block 404). In the system 100, a user provides spoken audio input to an audio input device, such as the microphone 128 (block 402). The controller 148 uses the multiple speech recognition engines 162 to generate a plurality of candidate speech recognition results. As described above, in some embodiments the controller 148 generates hybrid candidate speech recognition results using selected words from the candidate speech recognition result of a domain-specific speech recognition engine to replace selected words in the candidate speech recognition result of a general-purpose speech recognition engine. The speech recognition engines 162 also generate confidence score data that the system 100 uses during feature vector generation in the process 400.

Process 400 continues as the system 100 performs feature extraction to generate a plurality of feature vectors that each correspond to one of the candidate speech recognition results (block 406). In the system 100, the controller 148 uses the feature extractor 164 to generate feature vectors via word-sequence features that include one or more of the trigger pair, confidence score, and word-level features that are described above to generate a feature vector with the structure of the feature vector 202 in FIG. 2 or another similar structure for one or more word-sequence feature such as a trigger pair, confidence score, and word-level features. In the embodiment of FIG. 4, the controller 148 generates the word-level features using the bag-of-words with decay metric for the word-level feature elements of the feature vector.

Block 408 processes each speech recognition result using the standalone NLU module. The NLU module conducts two tasks, that is, slot filling and intent detection. For the speech recognition result in focus, the NLU module detects the slots contained in it and detects its intent. The NLU module also stores the last state of each direction of the bidirectional recurrent neural network (RNN) in the encoder, to support the subsequent step of feature extraction.

Block 410 extracts NLU related features based on the output of the NLU module for each speech recognition result. It extracts trigger features based on the word sequence and the slot(s) detected in block 208 for the speech recognition result in focus. It also concatenate the two last states of the bidirectional RNN in the encoder of the NLU module, which are stored in block 408, to construct the BLSTM feature for the speech recognition result in focus.

The process 400 continues as the controller 148 provides the feature vectors for the plurality of candidate speech recognition results to the neural network ranker 168 as inputs in an inference process to generate a plurality of ranking scores corresponding to the plurality of candidate speech recognition results (block 412). In one embodiment, the controller 148 uses the trained feed-forward deep neural network ranker 168 to generate the plurality of ranking scores at the output layer neurons of the neural network using an inference process. As described above, in another embodiment the controller 148 transmits the feature vector data, candidate speech recognition results, or an encoded version of the recorded audio speech recognition data to an external server using the wireless network device 154 where a processor in the server performs a portion of the process 400 to generate the ranking scores of the candidate speech recognition results.

In most instances the controller 148 generates a number of candidate speech recognition results and corresponding feature vectors n that matches the predetermined number of n feature vector inputs for which the neural network ranker 168 is configured to receive during a training process. However, in some instances if the number of feature vectors for the candidate speech recognition results is less than the maximum number n, then the controller 148 generates "void" feature vector inputs with all zero values to ensure that all of the neurons in the input layer of the neural network ranker 168 receive an input. The controller 148 ignores the scores for the corresponding output layer neurons for each of the void inputs while the neural network in the ranker 168 produces scores for the non-void feature vectors of the candidate search recognition results.

The process 400 continues as the controller 148 identifies the candidate speech recognition result that corresponds to the highest ranking score in the output layer of the neural network ranker 168 (block 414). For example each output neuron in the output layer of the neural network may generate an output value corresponding to the ranking score of one of the input feature vectors that the system 100 provides to the predetermined sets of input neurons in the input layer. The controller 148 then identifies the candidate speech recognition result with the highest ranking score based on the index of the output neuron that produces the highest ranking score within the neural network.

Process 400 continues as the controller 148 outputs (block 416) and uses the selected highest ranked speech recognition result as input from the user to operate the automated system (block 418). In the in-vehicle information system 100 of FIG. 1, the controller 148 operates various systems including, for example, a vehicle navigation system that uses the GPS 152, wireless network device 154, and LCD display 124 or HUD 120 to perform vehicle navigation operations in response to the speech input from the user. In another configuration, the controller 148 plays music through the audio output device 132 in response to the speech command. In still another configuration, the system 100 uses the smartphone 170 or another network connected device to place a hands-free phone call or transmit a text message based on the speech input from the user. While FIG. 1 depicts an in-vehicle information system embodiment, other embodiments employ automated systems that use the audio input data to control the operation of various hardware components and software applications.

While FIG. 1 depicts the in-vehicle information system 100 as an illustrative example of an automated system that performs speech recognition to receive and perform commands from a user, a similar speech recognition process can be implemented in other contexts. For example, a mobile electronic device such as the smartphone 170 or other suitable device typically includes one or more microphones and a processor that can implement the speech recognition engines, ranker, stored trigger pairs, and other components that implement a speech recognition and control system. In another embodiment, a home automation system controls HVAC and appliances in a house using at least one computing device that receives the speech input from the user and performs speech recognition using the multiple speech recognition engines to control the operation of various automated systems in the house. In each embodiment, the system is optionally configured to use different sets of domain-specific speech recognition engines that are tailored for the specific applications and operations of different automated systems.

Figure 5:
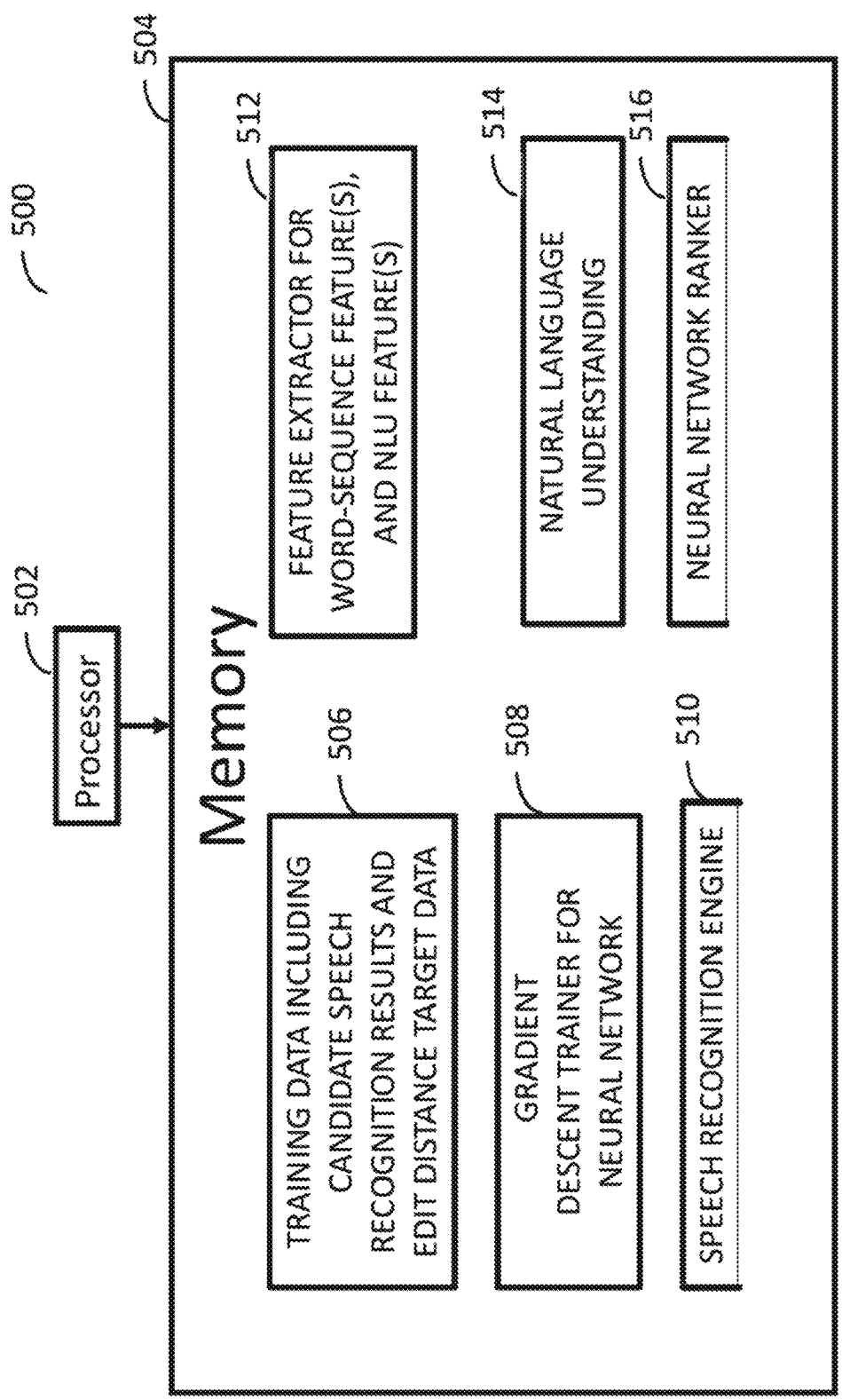
FIG. 5 is a block diagram of system configured to perform speech recognition.

In the system 100 of FIG. 1 and the speech recognition process of FIG. 4, the neural network ranker 168 is a trained feed-forward deep neural network. The neural network ranker 168 is trained prior to the operation of the system 100 to perform the speech recognition process that is described above. FIG. 5 depicts an illustrative embodiment of a computerized system 500 that is configured to train the neural network ranker 168 and FIG. 4 depicts a training process 400 for generating the trained neural network ranker 168.

The system 500 includes a processor 502 and a memory 504. The processor 502 includes, for example, one or more CPU cores that are optionally connected to a parallelized hardware accelerator that is designed for training neural networks in a time and power efficient manner. Examples of such accelerators include, for example, GPUs with compute shader units that are configured for neural network training and specifically programmed FPGA chips or ASIC hardware that is dedicated to training of neural networks. In some embodiments the processor 502 further comprises a cluster of computing devices that operate in parallel to perform the neural network training process.

The memory 504 includes, for example, a non-volatile solid state or magnetic data storage device and a volatile data storage device such as random access memory (RAM), which stores programmed instructions for operation of the system 500. In the configuration of FIG. 3, the memory 504 stores data corresponding to training input data 506, a gradient descent trainer 508 for a neural network, a speech recognition engine 510, a feature extractor 512, a natural language understanding module 514, and a neural network ranker 516.

The training data 506 include, for example, a large set of speech recognition results that are produced by the same speech recognition engines 162 that are used in the system 100 for a large set of predetermined inputs, which optionally include hybrid speech recognition results. The training speech recognition result data also include the confidence scores for the training speech recognition results. For each speech recognition result, the training data also includes a Levenshtein distance metric that quantifies the differences between the speech recognition result and the predetermined ground-truth speech input training data, which represent the canonically "correct" results in the training process. The Levenshtein distance metric is one example of an "edit distance" metric since the metric quantifies the amount of changes (edits) that are necessary to transform the speech recognition result from the speech recognition engine into the actual input that was used for the training data. Both of the speech recognition result and the ground-truth speech input training data are referred to as "strings" of text in the comparison metric. For example, the edit distance quantifies the number of changes that are needed to convert a speech recognition result string "Sally shells sea sells by the seashore" to a corresponding correct ground-truth training data string "Sally sells sea shells by the seashore".

The Levenshtein distance metric is known to the art in other contexts and has several properties including: (1) the Levenshtein distance is always at least the difference of the sizes of the two strings; (2) the Levenshtein distance is at most the length of the longer string; (3) the Levenshtein distance is zero if and only if the strings are equal; (4) if the strings are the same size, the Hamming distance is an upper bound on the Levenshtein distance; and (5) the Levenshtein distance between two strings is no greater than the sum of their Levenshtein distances from a third string (triangle inequality). The Hamming distance, in turn, refers to a metric of the minimum number of substitutions required to change one string into the other, or the minimum number of errors that could have transformed one string into the other. While the system 500 includes training data that are encoded with the Levenshtein distance for illustrative purposes, in alternative embodiments another edit distance metric is used to describe the differences between the training speech recognition results and the corresponding ground-truth training inputs.

In the embodiment of FIG. 5, the feature extractor 512 in the memory 504 is the same feature extractor 164 that is used in the system 100 described above. In particular, the processor 502 uses the feature extractor 512 to generate a feature vector from each of the training speech recognition results using one or more of the trigger pair, confidence score, and word-level features that are described above.

The gradient descent trainer 508 includes the stored program instructions and parameter data for a neural network training process that the processor 502 performs to train the neural network ranker 516 using feature vectors that the feature extractor 512 generates based on the training data 506. As is known to the art, gradient descent trainers include a class of related training processes that train a neural network in an iterative process by adjusting the parameters within the neural network to minimize the differences (errors) between the outputs of the neural network and a predetermined target function, which is also referred to as an "objective" function. While gradient descent training is generally known to the art and is not discussed in greater detail herein, the system 500 modifies the standard training process. In particular, a training process seeks to generate outputs with a neural network using the training data as inputs that minimize the errors between the outputs of the neural network and the expected target results from the predetermined training data. In some training processes, the target values typically specify if a given output is a binary "correct" or "incorrect", such a target output from the neural network ranker that provides a score to indicate if the feature vector input for a training speech recognition result is either 100% correct or is not correct in some way when compared to the ground-truth input in the training data. However, in the system 500, the gradient descent trainer 508 uses the edit distance target data in the training data 506 as a "soft" target to more accurately reflect the level of correctness for different training speech recognition results, which may include a range of errors that affect the ranking score over a continuous range instead of merely being completely correct or incorrect.

The processor 502 uses the "soft" target data in the objective function to perform the training process using the gradient descent trainer 508. For example, the configuration of FIG. 3 uses a "softmax" objective function of the form:

$$target_i = \frac{e^{-d_i}}{\sum_{i=0}^{n} e^{-d_i}} \tag{7}$$

in which $d_i$ is the edit distance of the $i^{th}$ speech recognition result from the reference transcript of the given speech input. During the training process, the gradient descent trainer 508 performs a cost minimization process where the "cost" refers to the cross-entropy between the output values of the neural network ranker 516 during each iteration of the training process and the target values generated by the objective function. The processor 502 provides batches of samples to the gradient descent trainer 508 during the training process, such as a batch of 180 training inputs that each include different training speech recognition results that are generated by the multiple speech recognition engines. The iterative process continues until the cross-entropy of the training set has not improved over a course of ten iterations, and the trained neural network parameters that produce the lowest overall entropy from all of the training data form the final trained neural network.

During the training process the processor 502 shuffles the same input feature vectors between different sets of input neurons in the neural network ranker 516 during different iterations of the training process to ensure that the position of a particular feature vector in the input layer of the neural network does not produce an incorrect bias in the trained neural network. As is described above in the inference process, if a particular set of training data do not include a sufficient number of candidate speech recognition results to provide inputs to all of the neurons in the input layer of the neural network ranker 516, the processor 502 generates "void" input feature vectors with zero value inputs. As is known in the art, the gradient descent optimization used in training process includes numeric training parameters and, in one configuration of the system 500, Adaptive Moment Estimation (Adam) optimization is used in the gradient descent trainer 508, and the hyperparameters of the gradient descent trainer 508 are $\alpha=0.001$, $\beta1=0.9$ and $\beta2=0.999$.

While FIG. 5 depicts a specific configuration of a computerized device 500 that generates the trained neural network ranker, in some embodiments the same system that uses the trained neural network ranker in a speech recognition process is further configured to train the neural network ranker. For example, the controller 148 in the system 100 is an example of a processor that is configurable to perform the neural network training process in some embodiments.

Figure 6:
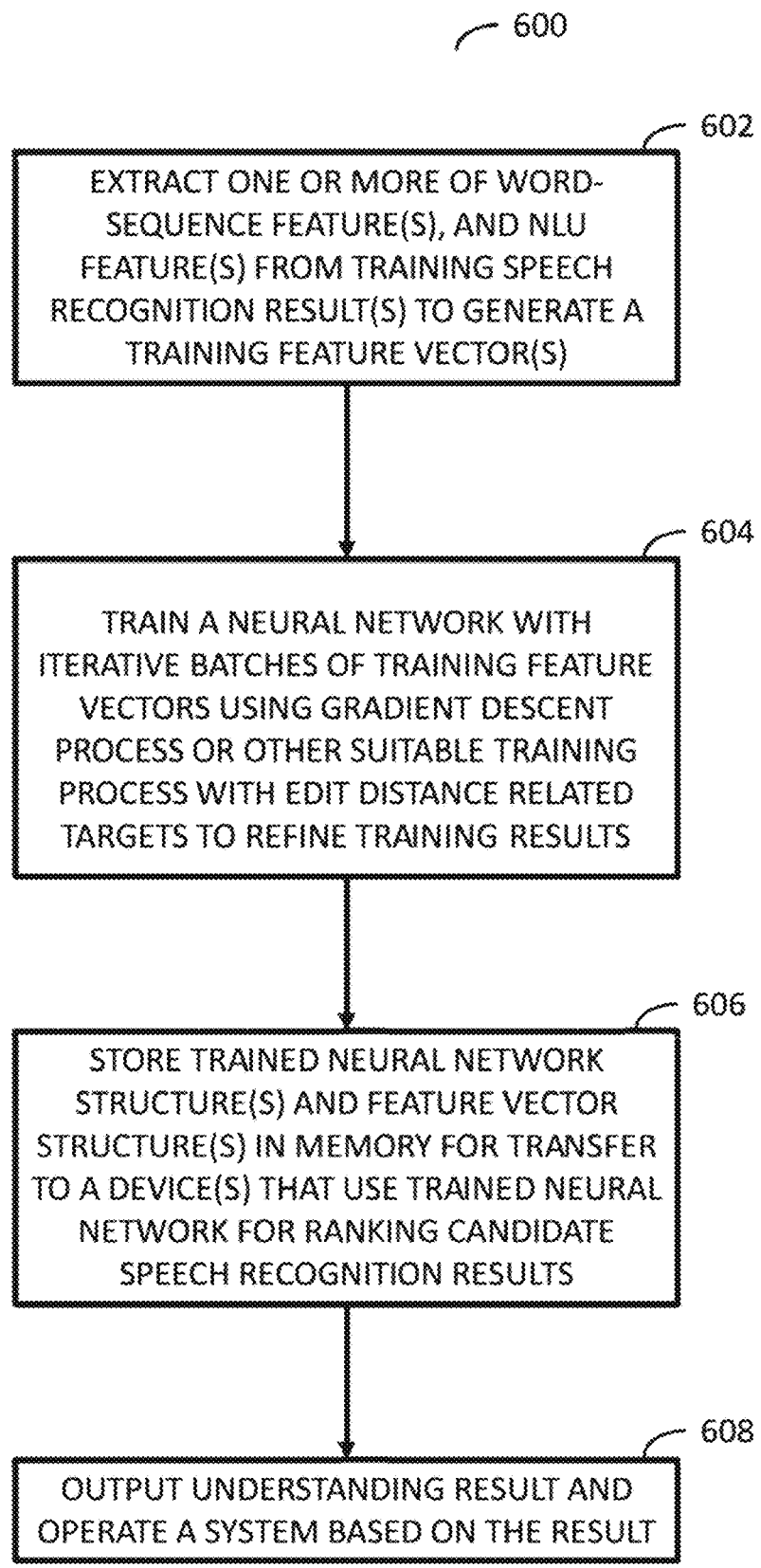
FIG. 6 is a flow diagram to train a speech recognition.

FIG. 6 depicts a process 600 for performing speech recognition using multiple speech recognition engines and a neural network ranker to select a candidate speech recognition result. In the description below, a reference to the process 600 performing a function or action refers to the operation of a processor to execute stored program instructions to perform the function or action in association with other components in the automated system. The process 600 is described in conjunction with the system 500 of FIG. 5 for illustrative purposes.

The process 600 begins as the system 500 generates a plurality of feature vectors corresponding to the plurality of training speech recognition results stored in the training data 506 (block 602). In the system 500, the processor 502 uses the feature extractor 512 to generate the plurality of feature vectors where each feature vector corresponds to one training speech recognition result in the training data 506. As described above, the controller 502 generates each feature vector including one or more of the trigger pair features, the confidence score, and the word-level features including the bag-of-words with decay features in at least one embodiment of the process 600.

As part of the feature extraction and feature generation process, in some embodiments the controller 502 generates the structure of the feature vector including the specific elements that map to the trigger pair features and word-level features. For example, as described above in the system 100, in some embodiments the controller 502 generates the feature vector with a structure that corresponds to only a portion of the words that are observed in the training data 506, such as the 90% most commonly observed words while the remaining 10% of the words that occur with the lowest frequency are not encoded into the structure of the feature vector. The processor 502 optionally identifies the most common trigger pair features and generates the structure for the most commonly observe pairs of trigger words that are present in the training data 506. In an embodiment in which the system 500 generates the structure for the feature vector during the process 600, the processor 502 stores the structure of the feature vectors with the feature extractor data 512 and the structure of the feature vector along with the neural network ranker 516 after completion of the training process is provided to automated systems that use the feature vectors with the specified structure as inputs to the trained neural network to generate the ranking scores for the candidate speech recognition results. In other embodiments, the structure of the feature vectors is determined a priori based on a natural language such as English or Chinese instead of being based specifically upon the contents of the training data 506.

The process 600 continues as the system 500 trains the neural network ranker 516 based on the feature vectors of the training speech recognition results and the soft target edit distance data from the training data 506 using the gradient descent trainer 508 (block 604). During the training process, the processor 502 uses the plurality of feature vectors corresponding to the plurality of training speech recognition results as inputs to the neural network ranker and trains the neural network ranker 516 based on the cost minimization process between the plurality of output scores generated by the neural network ranker during the training process and the objective function with the soft scores described above based on the predetermined edit distances between the plurality of training speech recognition results and predetermined correct inputs for each training speech recognition in the plurality of speech recognition results. During the process 600, the processor 502 modifies the input weighting coefficients and neuron bias values in the input and hidden layers of the neural network ranker 516 and to adjust the parameters of the activation functions in the output layer of neurons in an iterative manner using the gradient descent trainer 508.

After the training process is completed, the processor 502 stores the structure of the trained neural network ranker 516 and optionally the structure of the feature vectors in embodiments where the feature vectors are generated based on the training data in the memory 504 (block 606). The stored structure of the neural network ranker 516 and the feature vector structure are subsequently transferred to other automated systems, such as the system 100 of FIG. 1, which use the trained neural network ranker 516 and the feature extractor 512 to rank multiple candidate speech recognition results during speech recognition operations and then operate the system based on the result (block 608).

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

While all of the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

What is claimed is:

1. A method executed by a controller for speech recognition in a system comprising:
   parsing a plurality of candidate speech recognition results from a speech input;
   receiving a first plurality of feature vectors from each of the plurality of candidate speech recognition results from a first speech recognition engine, the first plurality of feature vectors includes a first confidence score;
   receiving a second plurality of feature vectors from each of the plurality of candidate speech recognition results from a second speech recognition engine that is different from the first speech recognition engine, the second plurality of feature vectors includes a second confidence score that is lower than the first confidence score;
   extracting, based on natural language understanding (NLU) information, a NLU result from each of the plurality of candidate speech recognition results;
   compressing, to a shared projection layer, the first plurality of feature vectors and the second plurality of feature vectors via the shared projection layer based on the NLU result and NLU related features;
   compressing the shared projection layer to a second projection layer further based on the NLU result and NLU related features, wherein the compression is via a shared projection matrix;
   associating, via a neural network ranker, a ranking score to each of the plurality of candidate speech recognition results, the ranking score being based on the plurality of feature vectors and the NLU result of each of the plurality of candidate speech recognition results, wherein the neural network ranker promotes the second confidence score to be greater than the first confidence score based on the NLU related features, in response to the first and second plurality of feature vectors being less than a threshold size, bypassing, by the controller, the shared and second projection layers such that the second plurality of feature vectors are fed directly to the neural network ranker, wherein the threshold size of feature vectors is less than 2 features per hypothesis;

selecting a speech recognition result from the plurality of candidate speech recognition results that is associated with the ranking score having the highest value; and operating the system using the selected speech recognition result from the plurality of candidate speech recognition results corresponding to the highest ranking score as an input.

2. The method of claim 1, wherein the neural network ranker is a deep feedforward neural network ranker.

3. The method of claim 1 wherein the first and second plurality of feature vectors includes a plurality of confidence scores, and further comprises:

by the controller, performing a linear regression process based on the plurality of confidence scores to generate a normalized plurality of confidence scores for each of the first and second plurality of feature vectors, the normalized plurality of confidence scores being based on a confidence score of one predetermined candidate speech recognition result in the plurality of candidate speech recognition results.

4. The method of claim 1, wherein the NLU information is a slot-based trigger features or a semantic feature representing slot and intent-sensitive sentence embedding.

5. The method of claim 4, wherein the first speech recognition engine is a domain-specific speech recognition engine, and the second speech recognition engine is a general-purpose speech recognition engine or cloud-based speech recognition engine.

6. The method of claim 5, wherein the first plurality of feature vectors and the second plurality of feature vectors include a Bidirectional Long Short-Term Memory (BLSTM) feature.

7. A method executed by a controller for speech recognition in a system comprising:

parsing a plurality of candidate speech recognition results from a speech input;

extracting a first plurality of feature vectors from each of the plurality of candidate speech recognition results via a first speech recognition engine;

extracting a second plurality of feature vectors from each of the plurality of candidate speech recognition results via a second speech recognition engine that is different from the first speech recognition engine;

extracting, based on natural language understanding (NLU) information, a NLU result from each of the plurality of candidate speech recognition results;

compressing, to a shared projection layer, the first plurality of feature vectors and the second plurality of feature vectors via a shared projection layer based on based on the NLU result and NLU related features;

compressing the shared projection layer to a second projection layer further based on the NLU result and NLU related features, wherein the compressing is via a share projection matrix;

associating, via a neural network ranker, a ranking score to each of the plurality of candidate speech recognition results, the ranking score being based on the plurality of feature vectors and the NLU result of each of the plurality of candidate speech recognition results, in response to the first and second plurality of feature vectors being less than a threshold size, bypassing, by the controller, the shared and second projection layers such that the second plurality of feature vectors are fed directly to the neural network ranker, wherein the threshold size of feature vectors is less than 2 features per hypothesis;

selecting a speech recognition result from the plurality of candidate speech recognition results that is associated with the ranking score having the highest value; and operating the system using the selected speech recognition result from the plurality of candidate speech recognition results corresponding to the highest ranking score as an input.

8. The method of claim 7, wherein the neural network ranker is a deep feedforward neural network ranker.

9. The method of claim 7, wherein the first and second plurality of feature vectors includes a plurality of confidence scores, and further comprises:

by the controller, performing a linear regression process based on the plurality of confidence scores to generate a normalized plurality of confidence scores for each of the first and second plurality of feature vectors, the normalized plurality of confidence scores being based on a confidence score of one predetermined candidate speech recognition result in the plurality of candidate speech recognition results.

10. The method of claim 7, wherein the NLU information is a slot-based trigger features or a semantic feature representing slot and intent-sensitive sentence embedding.

11. The method of claim 10, wherein the first speech recognition engine is a domain-specific speech recognition engine, and the second speech recognition engine is a general-purpose speech recognition engine or cloud-based speech recognition engine.

12. The method of claim 11, wherein the first plurality of feature vectors and the second plurality of feature vectors include a Bidirectional Long Short-Term Memory (BLSTM) feature.

13. A speech recognition system, comprising:

a microphone configured to receive a speech input from one or more users;

a processor in communication with the microphone, the processor programmed to:

parse a plurality of candidate speech recognition results from a speech input;

receive a first plurality of feature vectors from each of the plurality of candidate speech recognition results from a first speech recognition engine, the first plurality of feature vectors includes a first confidence score;

receive a second plurality of feature vectors from each of the plurality of candidate speech recognition results from a second speech recognition engine that is different from the first speech recognition engine, the second plurality of feature vectors includes a second confidence score that is lower than the first confidence score;

extract, based on natural language understanding (NLU) information, a NLU result from each of the plurality of candidate speech recognition results;

associate, via a neural network ranker, a ranking score to each of the plurality of candidate speech recognition results, the ranking score being based on the plurality of feature vectors and the NLU result of each of the plurality of candidate speech recognition results, wherein the neural network ranker promotes the second confidence score to be greater than the first confidence score based on the NLU related features, in response to the first and second plurality of feature vectors being less than a threshold size, bypassing, by the controller, a shared projection layer and a second projection layer such that the second plurality of feature vectors are fed directly to the neural network ranker, wherein the threshold size of feature vectors is less than 2 features per hypothesis; and select a speech recognition result from the plurality of candidate speech recognition results that is associated with the ranking score having the highest value.

14. The speech recognition system of claim 13, wherein the processor is further programmed to operate the system using the selected speech recognition result from the plurality of candidate speech recognition results corresponding to the highest ranking score as an input.

15. The speech recognition system of claim 13, wherein the processor is further programmed to train a neural network associated with the speech recognition system utilizing at least the NLU result.

16. The speech recognition system of claim 13, wherein the processor is further programmed to compress, to the shared projection layer, the first plurality of feature vectors and the second plurality of feature vectors via the shared projection layer based on the NLU result and NLU related features, and compress the shared projection layer to a second projection layer further based on the NLU result and NLU related features.

* * * * *